Nov. 5, 1968  J. G. LEPISTO ET AL  3,408,903
BAG MANUFACTURE

Filed March 30, 1967  3 Sheets-Sheet 1

FIG. I.

Nov. 5, 1968        J. G. LEPISTO ET AL        3,408,903
                      BAG MANUFACTURE
Filed March 30, 1967                        3 Sheets-Sheet 2

United States Patent Office 3,408,903
Patented Nov. 5, 1968

3,408,903
BAG MANUFACTURE
John G. Lepisto and William J. Tilton, Middletown, Ohio, assignors to Albemarle Paper Company, Richmond, Va., a corporation of Virginia
Filed Mar. 30, 1967, Ser. No. 626,998
10 Claims. (Cl. 93—20)

ABSTRACT OF THE DISCLOSURE

Apparatus for manufacturing gusseted multi-wall bags having a preformed plastic inner liner. A section of a flexible plastic tube that is moving through a multi-wall bag tuber is inflated to press the tube into the contour of the enveloping outer paper plies to form gussets in the tubing matching those in the paper plies. A rotating air needle periodically punctures the nested tubes and supplies air when needed to the inflated portion of the plastic inner liner. The invention avoids shutting down the tuber in order to reinflate the plastic inner liner when air pressure drops below that necessary to conform the plastic tube to the outer paper plies.

CROSS-REFERENCES TO RELATED APPLICATIONS

The present invention is an improvement on the process and apparatus for forming multi-ply bags disclosed in U.S. Patent 3,291,375 and patent application S.N. 558,182 filed Apr. 28, 1966 (which application is a division of U.S. Patent 3,291,375) and patent application S.N. 582,690 filed Sept. 28, 1966. The foregoing patent and applications are owned by the assignee of the present application.

BACKGROUND OF THE INVENTION

Field of the invention

This invention relates to process and apparatus for the manufacture of multi-ply bags. More specifically it relates to process and apparatus for the manufacture of gusseted multi-ply bags having a gusseted thermoplastic inner ply made from preformed plastic tubing.

Description of the prior art

The process and apparatus disclosed in the aforementioned patent and related patent applications permits the production of gusseted multi-ply thermoplastic inner lined bags having numerous advantages over processes and apparatuses used heretofore to produce multi-ply bags. The provision of an inflated portion of the preformed plastic tube together with use of a mandrel which permits forming the paper and inflated plastic tube into a co-extensive, nested, gusseted bag length results in a bag which is considerably stronger than that provided in prior art plastic lined gusseted bags. In the apparatuses and processes disclosed in the above noted patent and patent applications some difficulty was experienced in maintaining the preformed plastic tube at the desired degree of inflation. Over a period of time the air that was initially trapped in the tube between the two sets of pinch rolls would gradually escape and the plastic tubing would not be pressed firmly into the gussets formed in the paper and thus did not fully conform to the contour of the paper ply causing wrinkles and misalignment of the inner liner. Heretofore it was necessary to stop the tuber machine periodically and to puncture the nested tubes and reinflate the trapped bubble in the plastic inner liner. In addition to causing loss of production by shutting down the tuber this procedure resulted in a bag which had to be discarded because of the puncture produced in the wall of the bag by reinflating the bubble.

SUMMARY OF THE INVENTION

It is an object of the present invention to provide a process for producing gusseted multi-ply bags having preformed plastic inner liners which process includes the periodic reinflation of the plastic line to assure conformance of the liner with the shape of the outer paper plies.

Another object of the present invention is to provide an apparatus for producing gusseted multi-ply bags having preformed plastic inner liners which apparatus provides means for automatically periodically reinflating the plastic inner liner.

A further object of the present invention is to provide a method and apparatus which permits production of gusseted multiply bags having a preformed plastic inner liner at high production rates and without damaging any of the bags produced.

The process aspect of the present invention for forming a gusseted multi-ply bag may be carried out by first advancing a web of sheet material adapted to be formed into the outer ply of the bag. A preformed tube of plastic material adapted to be formed into the plastic inner liner of the bag is advanced co-extensively with the web of sheet material. A portion of the preformed tube of plastic material is inflated with a gas. A part of the inflated portion of the preformed tube of plastic material is then partially flattened. The web of sheet material is then enfolded to form a partially flattened tube around the partially flattened part of the inflated portion of the preformed tube of plastic material. Gussets are formed in the tube of sheet material and the preformed tube of plastic material simultaneously along each side area thereof. The preformed tube of plastic material is maintained in an inflated state by adding gas thereto without arresting advancement of the preformed tube. The nested gusseted tubes of sheet material and plastic are then flattened to form a length of bag forming stock.

The apparatus aspect of the present invention is exemplified by an apparatus for forming gusseted multi-ply bags which includes spaced apart means for pressing together opposed wall portions of a preformed tube of plastic material to provide an inflated section of the tube. Mandrel means is provided which includes gusset forming devices for shaping one or more paper webs and the inflated portion of the preformed tube of plastic material into a length of gusseted multi-ply bag stock. Means is provided to maintain the inflated portion of the preformed tube at the desired pressure. Means for moving the length of gusseted multi-ply bag stock through the bag forming apparatus is also provided.

The present invention provides a process and an apparatus which permits continuous measurement and reinflation of the trapped bubble in the plastic inner ply without shutting down the tuber machine and without damaging the bag stock.

BRIEF DESCRIPTION OF THE DRAWINGS

The foregoing, and other objects, features and advantages of the present invention will be apparent from a consideration of the following specification taken in conjunction with the accompanying drawings in which like reference characters designate the same or similar parts through the several views.

DESCRIPTION OF THE PREFERRED EMBODIMENTS

Figure 1:
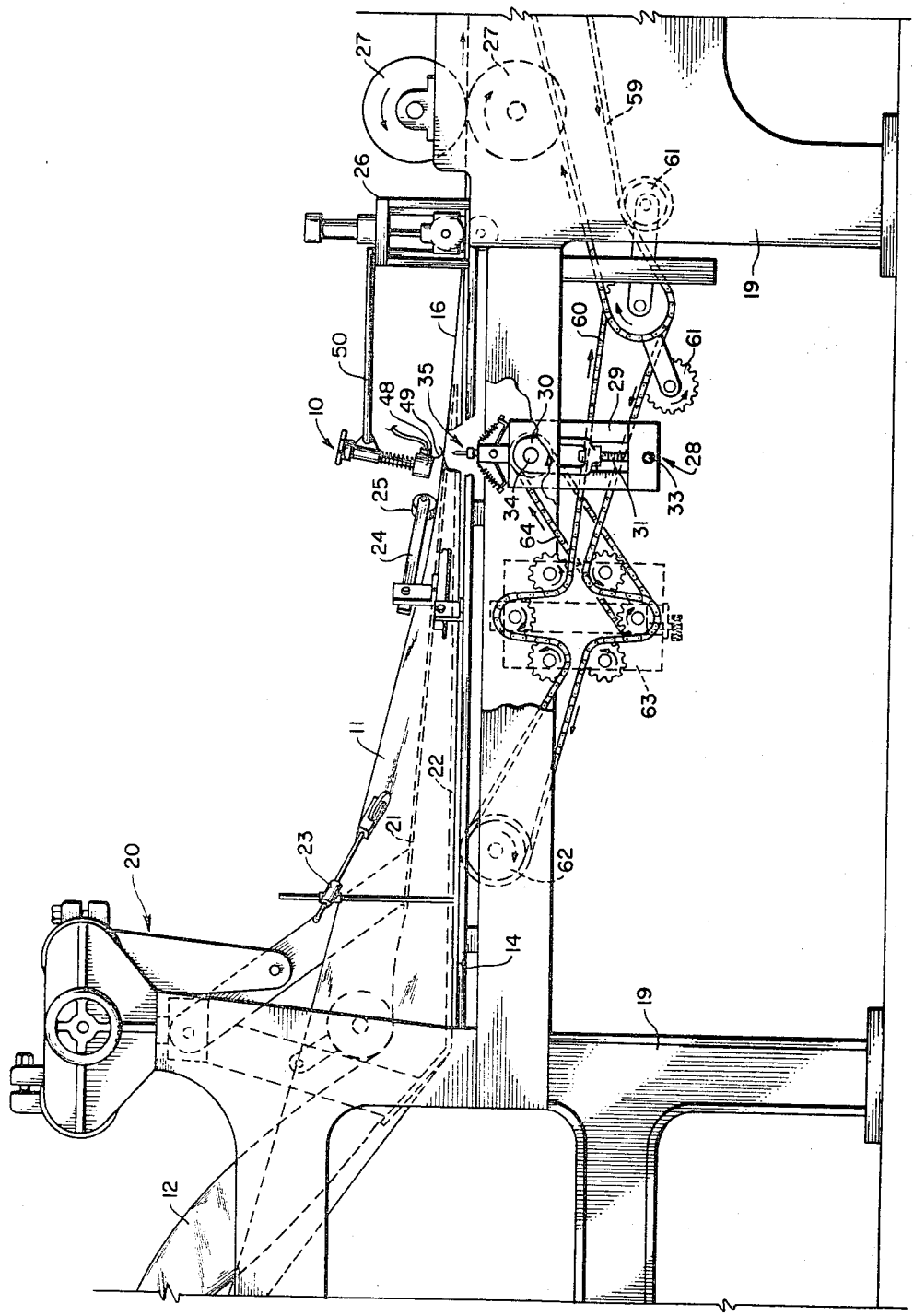
FIGURE 1 is an elevational view of a portion of a bag forming apparatus constructed in accordance with the present invention.
Figure 2:
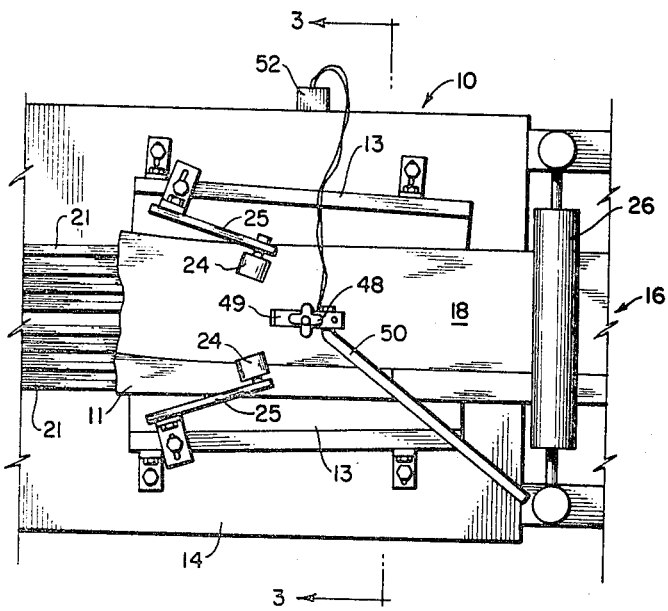
FIGURE 2 is a plan view of a portion of the bag forming apparatus shown in FIGURE 1.

Referring now to FIGURES 1 and 2, a bag forming apparatus constructed in accordance with the present invention is designated generally by the numeral 10. The apparatus receives one or more paper webs 11, or other bag forming material, folds the webs longitudinally into a series of nested tubes and adhesively secures the two edges of each ply of the web together. A preformed tube of plastic material 12 is inflated with a gas such as air and is enveloped by enfolding the paper plies around a mandrel through which the inflated plastic tube passes. Gusset skids 13 attached to the top of forming table 14 act on either side of the nested plastic and paper tubes to produce generally V-shaped gussets 15 (see FIGURE 5) in the sides of the nested tubes. The length of bag forming stock, designated generally by the numeral 16, includes the inner plastic ply 17 and one or more outer paper plies 18. It is understood that the outer plies may include any number of plies of paper or other material, including additional sheets of thermoplastic material if desired.

As seen in FIGURE 1 the tuber or bag forming apparatus 10 includes a support structure 19 for the forming table 14 and other portions of the equipment. A mandrel support structure, designated generally by the numeral 20, is attached to the support structure 19 and provides support for a pair of adjustable upper mandrel blades 21—21 and a pair of adjustable lower mandrel blades 22—22. The tube of plastic 12 runs in between the upper and lower pairs of blades and the paper plies are run on the outside of the blades. Wheel equipped assemblies 23 are mounted on the forming table and are used to enfold the paper web 11 around the mandrel containing the inflated portion of the preformed tube of plastic material 12. As seen in FIGURE 2 ironing rollers 24, mounted on arms 25, press the paper web 11 around the upper and lower mandrel blades and form the paper into a generally rectangular shape. The length of bag forming stock passes between the nip of lower squeeze roller assembly 26. This assembly in conjunction with an upper squeeze roller assembly (not shown) traps the air in the inflated bubble 12. A pair of drive rollers 27—27 connected to a source of power (not shown) serve to pull the plastic tube 12 and paper web 11 through the bag forming apparatus. A conventional bag cutting device (not shown) is located behind the drive rollers and cuts the bag stock 16 into individual bag lengths which are subsequently closed by suitable means, such as thread stitching, to form a completed bag.

A more complete detailed description of the portion of the bag forming apparatus described above is found in the aforementioned patent and patent applications, the disclosure of which are hereby incorporated into the present application by reference.

Figure 3:
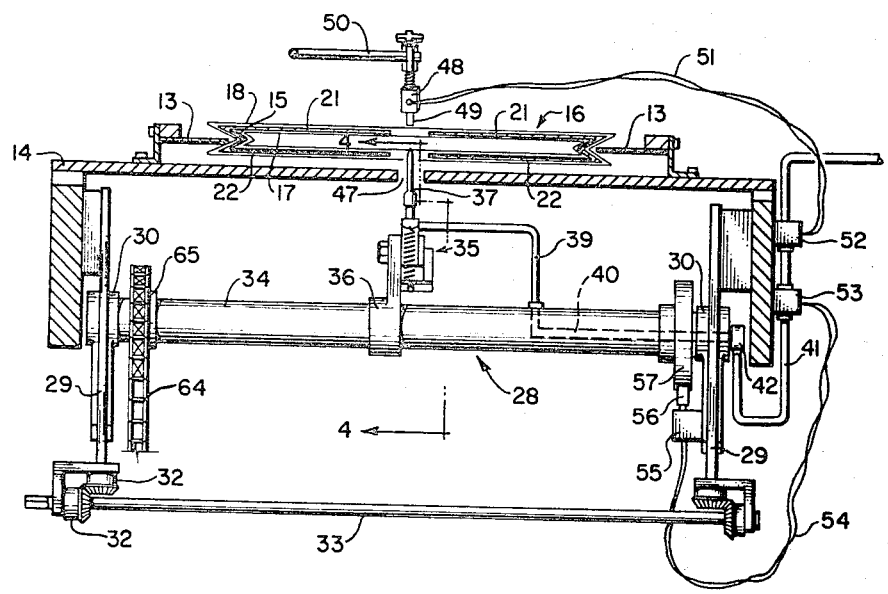
FIGURE 3 is a cross sectional view of the apparatus of FIGURE 2 taken along line 3—3.

As seen in FIGURES 1 and 3 the present bag forming apparatus includes a needle perforator assembly, designated generally by the numeral 28. The assembly includes a rectangular shaped support bracket 29 mounted on each side of the forming table 14. A bearing block 30 is received in each support bracket 29 and is so arranged to be vertically positioned by rotation of threaded rod 31 received in a threaded opening in the lower portion of each bearing block. Each threaded rod 31 is driven through a set of gears 32—32, one of which is mounted on and rotated by elevator rod 33. A shaft 34 has its ends journaled in the bearing blocks 30—30. A rotatable hollow air needle assembly 35 is mounted on shaft 34 by means of bracket 36. The air needle 37 is provided with a passage 38 therein which connects with air supply line 39 that is in turn connected to a bore 40 provided in shaft 34. The bore 40 is in turn connected to exterior air supply line 41 by means of rotating coupling 42.

Figure 4:
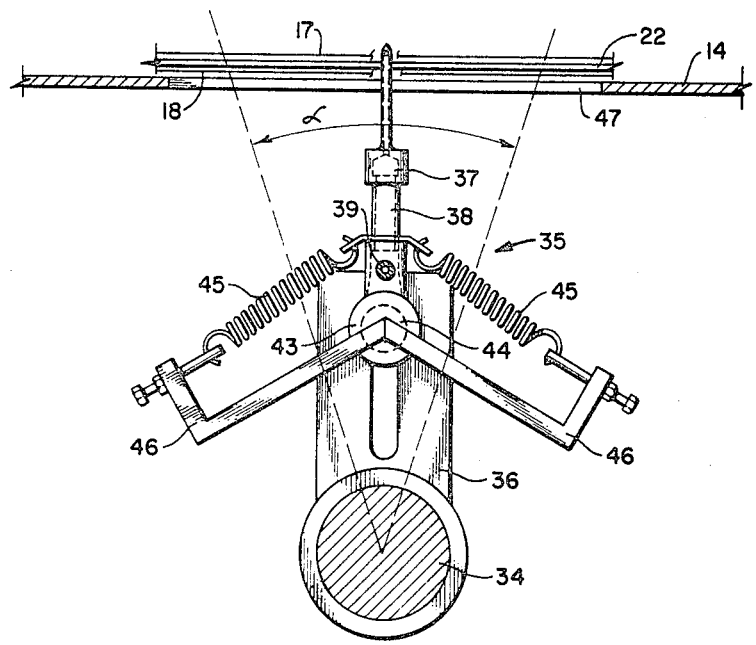
FIGURE 4 is an enlarged cross sectional view of a portion of the apparatus of FIGURE 3 taken along the line 4—4.

Referring to FIGURE 4 it is seen that the air needle 37 is pivotably mounted on bracket 36 by means of a sleeve 43 which is received on mounting stud 44. The air needle is maintained in a radially extended position on the bracket by means of a pair of springs 45—45. The outward end of each spring 45 is attached to an L-shaped bracket 46 which is in turn attached at its inward end to mounting stud 44. By means of the foregoing arrangement the air needle 37 can pivot to a limited extent around mounting stud 44. The tip of air needle 37 projects through a narrow longitudinal opening 47 provided in the surface of forming table 14. As shaft 34 rotates the needle assembly 35 the tip of the needle 37 punctures the lower wall area of the outer paper ply 18 and the inner plastic ply 17 of the bag stock as the needle moves through the opening 47 in the forming table 14. As seen in FIGURE 3 the air needle 37 and the opening 47 are positioned in the longitudinal opening between the lower pair of former blades 22—22.

As seen in FIGURES 1, 2 and 3, an electrical switch 48 has an arm 49 which contacts the upper surface of outer paper ply 18. This switch is mounted on support assembly 50 which is adjustable to position the switch to achieve the desired degree of inflation of inflated plastic tube 12. Electrical leads 51 connect switch 48 to solenoid valve 52 which is in turn connected by means of an air line to a second solenoid valve 53. The second solenoid valve 53 is connected by electrical leads 54 to switch 55 having an arm 56 which makes contact with cam 57 mounted on shaft 34.

Power for the rotating needle assembly is derived initially from chain belt 59 which is connected on one end to the power source for the cutter assembly (not shown). This chain belt drives chain belt 60 through a pair of sprockets, each chain having idler sprockets 61—61 to adjust the slack therein. Chain belt 60 drives a thumb notch cutter 62 through an adjustable sprocket device 63. The adjustable sprocket device furnishes power to the hollow air needle assembly 35 by means of chain drive 64. As seen in FIGURE 3 one end of chain drive 64 is connected to sprocket 65 which is keyed to and drives shaft 34 to rotate the needle assembly 35.

In operation the apparatus of the present invention is supplied from a storage roll (not shown) with the length of preformed plastic tubing material 12, which may be thin wall flexible seamless plastic tubing. The tubing may be produced by the blown tube method using a cylindrical die assembly for extruding plastic, or may be preformed by longitudinally heat sealing or adhesively sealing a flat web of the thermoplastic sheet material into a preformed tubing. If desired, heat sealing can be carried out on the tuber to produce a preformed tube just prior to enveloping the tube in the outer paper plies. The one or more paper webs 11 are supplied from storage rolls (not shown) as is convntional. The paper plies will have longitudinal bands of adhesive along one edge of each of the plies and transverse bands or dots of adhesive applied by conventional means before entering the section of the tuber shown in FIGURE 1.

A portion of the plastic tube 12 is inflated using an air supply hose and pulled by hand through the tuber together with the paper web to thread up the tuber. The bubble is then trapped between the nip of the upper pinch roll assembly and the nip of the lower pinch roll assembly 26. The tuber is then started up and bag stock 18 is continuously formed. After a period of time air pressure will drop in the inflated portion of the plastic tube 12 due to slow leakage by the lower pinch roll assembly 26. When this occurs, the plastic tube will deflate to the point where the spring loaded arm 49 of switch 48 will move downward thereby actuating the switch. Switch 48 is normally open when the tube 12 is properly inflated and arm 49 is in the upward position. Switch 48 will actuate solenoid valve 52 supplying air from a source of compressed air to second solenoid valve 53. Cam 57 is so designed to actuate normally open switch 55 only during the time the air needle assembly 35 is passing through the short arc "alpha," shown in FIGURE 4, in the uppermost portion of its circular path. As seen in FIGURE 3 cam 57 is designed to actuate switch 55 only during the time when air needle assembly 35 has punctured the paper 18 and plastic 19 and the tip is within the bag stock. Thus while the needle is moving through the arc "alpha" electrical leads 54 actuate solenoid valve 53 permitting air to flow to the air needle 37 through the connecting passages and lines as described hereinbefore. The spring linkage arrangement for air needle 37 permits the needle to pivot slightly and prevents the needle from tearing the paper and plastic bag plies when there is slight difference in the speed of the needle and bag stock. Air supplied through the needle 37 reinflates the trapped bubble in plastic tube 12 until the upper wall of the tube and remaining paper plies press against the arm 49 and raise it sufficiently to open switch 48. Thus it can be seen that the air needle 35 periodically punctures the bag stock and supplies air for short intervals until the plastic tube achieves the proper degree of inflation. While the air needle assembly punctures the bag stock each time it revolves it will supply air to the inflated bubble only when switch 48 indicates that the bubble is underinflated.

Figure 5:
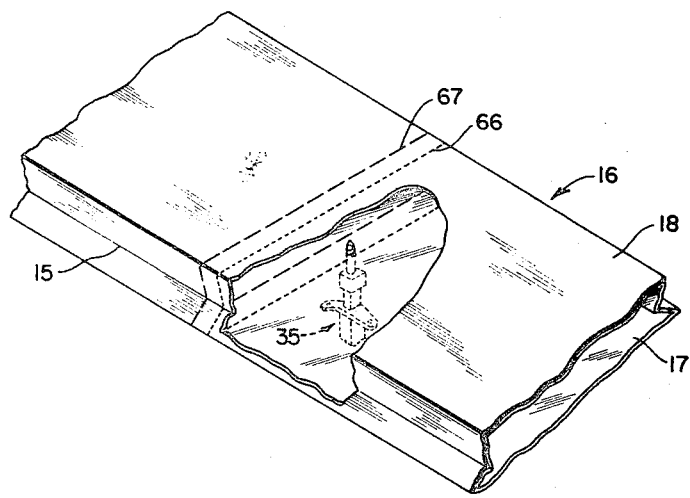
FIGURE 5 is a perspective view of a portion of a length of bag stock with a section broken away to more clearly show the position of the puncture produced by the air needle.

Referring now to FIGURE 5 the air needle assembly is adjusted to puncture the bag stock slightly inside the dotted line 66 on which the bag stock will be transversely cut to provide individual bag lengths. Dashed line 67 indicates the position where the bag will be closed either by adhesively sealing, thread stitching, heat sealing, or combinations thereof to fabricate the bag lengths into bags having a closure at one end thereof. It is seen that the needle punctures the bag stock in an area between cut-off line 66 and closure line 67. It is important that the puncture be made in the bag stock at this point to prevent the puncture from occurring in the area of the bag inside the portion that may be hermetically sealed. By so positioning the air needle perforation no damage is done to either one of the bag lengths since the area wherein the puncture appears is below the seal line utilized for closing the bottom of one bag and above the seal line used for closing the top of the adjoining bag.

The apparatus and process of the present invention produces gusseted bags having a plastic inner liner having perfect conformance to the enveloping paper plies. By maintaining continuous inflation of the plastic tube the inner ply is continuously maintained in uniform contact over the entire inner surface of the enveloping paper plies, particularly in the side areas to form perfect gussets. Folds, creases, and misalignments of the inner plastic ply are thereby avoided.

While polyethylene tubing is preferred because of low cost in manufacturing bags using the process and apparatus of this invention, it is understood that any other thermoplastic material such as polyvinyl chloride, saran, polyester, or other material of a thermoplastic nature may be used for the plastic tube.

While there has been described what is at present preferred embodiments of the present invention it will be apparent to those skilled in the art that various modifications and changes may be made without departing from the essence of the invention. It is intended to cover herein all such modifications and changes as come within the true scope and spirit of the claims.

What is claimed is:
1. In a process for forming a gusseted multi-ply bag the steps of:
 (a) advancing a web of sheet material adapted to be formed into the outer ply of said bag;
 (b) advancing a preformed tube of plastic material adapted to be formed into the plastic inner liner of said bag co-extensively with said web of sheet material;
 (c) inflating a portion of said preformed tube of plastic material with a gas;
 (d) partially flattening a part of said inflated portion of said preformed tube of plastic material;
 (e) infolding said web of sheet material to form a partially flattened tube around said partially flattened part of said inflated portion of said preformed tube of plastic material;
 (f) forming a gusset in said tube of sheet material and said preformed tube of plastic material simultaneously along each side area thereof;
 (g) maintaining said preformed tube of plastic material in an inflated state by adding a gas thereto without arresting the advancement of said preformed tube; and
 (h) flattening the nested gusseted tubes of sheet material and plastic to form a length of bag-forming stock.

2. The process defined in claim 1 including the additional steps of:
 (a) severing said length of bag-forming stock into bag lengths; and
 (b) closing at least one end of each of said bag lengths to form a gusseted multi-ply bag.

3. The process defined in claim 1 wherein step (g) is carried out by periodically puncturing said tube of plastic material and adding said gas through the puncture.

4. The process defined in claim 3 including the steps of determining the degree of inflation of said tube of plastic material and adding said gas thereto only when said tube is underinflated.

5. The process defined in claim 3 including the additional step of severing said length of bag-forming stock at locations adjacent each perforation to produce bag lengths.

6. In an apparatus for forming gusseted multi-ply bags, the combination comprising:
 (a) spaced apart means for pressing together opposed wall portions of a preformed tube of plastic material to provide an inflated section of said tube;
 (b) mandrel means, including gusset forming devices, for shaping one or more paper webs and said inflated portion of said preformed tube of plastic material into a length of gusseted multi-ply bag stock;
 (c) means to maintain said inflated portion of said preformed tube of plastic material at the desired pressure; and
 (d) means for moving said length of gusseted multi-ply bag stock through said bag forming apparatus.

7. The apparatus defined in claim 6 wherein the means set forth in paragraph (c) includes a gas supply needle which periodically punctures one wall of said bag stock.

8. The apparatus defined in claim 7 wherein said needle is mounted on a rotating shaft and is adapted to puncture said bag stock at length intervals substantially corresponding to the length of the bag to be cut from said bag stock.

9. The apparatus defined in claim 7 including means to measure the degree of inflation of said preformed tube and to supply gas to said needle when said tube is underinflated.

10. The apparatus defined in claim 9 wherein said means to measure the degree of inflation includes an electrical switch having an arm actuated by the inflated portion of said tube, which switch controls a solenoid valve in the gas supply line leading to said needle.

References Cited

UNITED STATES PATENTS

| | | | |
|---|---|---|---|
| 3,146,491 | 9/1964 | Eyquem | 18—5 |
| 3,300,556 | 1/1967 | Battenfeld et al. | 18—5 |
| 3,334,552 | 8/1967 | Kugler | 93—35 |
| 3,336,846 | 8/1967 | Berghgracht | 93—20 XR |

BERNARD STICKNEY, *Primary Examiner.*